United States Patent [19]

Tsukamoto

[11] Patent Number: 5,092,686
[45] Date of Patent: Mar. 3, 1992

[54] ELECTRONIC EQUIPMENT WITH DISPLAY & CHANGEABLE PRINT FONT

[76] Inventor: Takahiro Tsukamoto, c/o Canon Kabushiki Kaisha, 30-2, 3-chome, Shimomaruko, Ohta-ku, Tokyo, Japan

[21] Appl. No.: 579,290

[22] Filed: Sep. 7, 1990

Related U.S. Application Data

[63] Continuation of Ser. No. 219,853, Jul. 13, 1988, abandoned, which is a continuation of Ser. No. 937,477, Dec. 2, 1986, abandoned, which is a continuation of Ser. No. 698,834, Feb. 6, 1985, abandoned.

[30] Foreign Application Priority Data

Feb. 14, 1984 [JP] Japan .................. 59-24445
Jun. 22, 1984 [JP] Japan .................. 59-127393
Jun. 22, 1984 [JP] Japan .................. 59-127394

[51] Int. Cl.$^5$ ........................ B41J 3/46
[52] U.S. Cl. .................. 400/83; 400/121; 400/692
[58] Field of Search ........... 400/171, 692, 83, 175, 400/121

[56] References Cited

U.S. PATENT DOCUMENTS

| | | | |
|---|---|---|---|
| 4,124,843 | 11/1978 | Bramson et al. | 400/83 |
| 4,217,055 | 8/1980 | Moon | 400/171 |
| 4,323,315 | 4/1982 | Demonte et al. | 400/83 |
| 4,382,702 | 5/1983 | Fessel | 400/83 |
| 4,386,862 | 6/1983 | Kittel et al. | 400/175 |
| 4,388,010 | 6/1983 | Mott et al. | 400/692 |
| 4,430,671 | 2/1984 | Tamer | 358/192.1 |
| 4,459,585 | 7/1984 | Pasternak | 340/744 |
| 4,468,754 | 8/1984 | Asada et al. | 400/83 |
| 4,480,932 | 11/1984 | Willcox | 400/171 |
| 4,497,589 | 2/1985 | Figini | 400/83 |
| 4,559,561 | 12/1985 | Amano et al. | 358/192.1 |

FOREIGN PATENT DOCUMENTS

| | | | |
|---|---|---|---|
| 95914 | 12/1983 | European Pat. Off. | 400/83 |
| 110632 | 6/1984 | European Pat. Off. | 400/692 |
| 2900438 | 7/1980 | Fed. Rep. of Germany | 400/144.3 |
| 44863 | 3/1980 | Japan | 400/171 |
| 11187 | 1/1983 | Japan | 400/103 |
| 63482 | 4/1983 | Japan | 400/171 |
| 211476 | 12/1983 | Japan | 400/83 |
| 57768 | 4/1984 | Japan | 400/171 |
| 2083670 | 3/1982 | United Kingdom | 400/83 |

OTHER PUBLICATIONS

Cooper, "Electronic . . . Coding" IBM Technical Disclosure Bulletin, vol. 19, No. 11, p. 4242, 4/77.

Primary Examiner—David A. Wiecking

[57] ABSTRACT

A printer includes a memory for storing therein a plurality of fonts and font names thereof, selection means for selecting one of the fonts stored in the memory, a display unit for displaying the font name of the selected font and a print unit for printing characters in the selected font.

8 Claims, 6 Drawing Sheets

ELECTRONIC EQUIPMENT WITH DISPLAY & CHANGEABLE PRINT FONT

This application is a continuation of application Ser. No. 07/219,853 filed July 13, 1988, now abandoned, which is a continuation of application Ser. No. 06/937,477 filed Dec. 2, 1986, now abandoned, which is a continuation of application Ser. No. 06/698,834, filed Feb. 6, 1985 now abandoned.

BACKGROUND OF THE INVENTION

1. Field of the Invention

The present invention relates to a printer which indicates a font name of print characters to an operator, and more particularly to a printer which stores two or more font data in a character generator ROM(CG ROM), selects one of the fonts by input means such as a keyboard, enables printing in the selected font and displays information on the selected font currently being used on a display capable of displaying information necessary for printing.

2. Description of the Prior Art

In a prior art printer of this type, data on a font of print characters is stored in a character generating external memory (ROM pack) and the ROM pack is loaded in the printer to enable printing of characters in a desired font.

However, since as many ROM packs as the number of desired font types are required, it is necessary to previously check the type of font to be used as the number of types of font increases.

The presently available printer may include a control circuit such as a microcomputer, a memory such as a ROM and an operator circuit. In such a printer, character data of several fonts may be stored in the CG ROM and characters of a desired font may be formed in dot matrix.

A plurality of fonts may be stored in a large capacity memory in a single piece of equipment. In such equipment, as the number of types of font increases, means for indicating the type of font currently being used is required.

SUMMARY OF THE INVENTION

It is an object of the present invention to provide a printer which can indicate the type of font currently being used.

In order to achieve the above object, in accordance with the present invention, the name of the font is displayed when external memory means which stores therein at least one type of font is loaded, until any key is depressed.

It is another object of the present invention to provide a printer which can indicate the name of the font currently being used on a display of the printer or display the name of font selected in the font selection operation.

In order to achieve the above object, in accordance with the present invention, the name of the font is displayed for a predetermined period when external memory means which stores therein at least one type of font is loaded.

It is another object of the present invention to provide a printer which has memory means which stores therein a plurality of font names and displays a selected one of the font names.

It is another object of the present invention to provide a printer which selects one of a plurality of font names and displays the selected font name.

It is another object of the present invention to provide an electronic equipment which displays data when external memory means, which stores therein such data, is connected to the equipment.

It is another object of the present invention to provide an electronic equipment which has means for erasing a displayed font name.

It is another object of the present invention to provide electronic equipment which displays the font name for a predetermined period.

DETAILED DESCRIPTION OF THE PREFERRED EMBODIMENTS

First Embodiment

Figure 1:
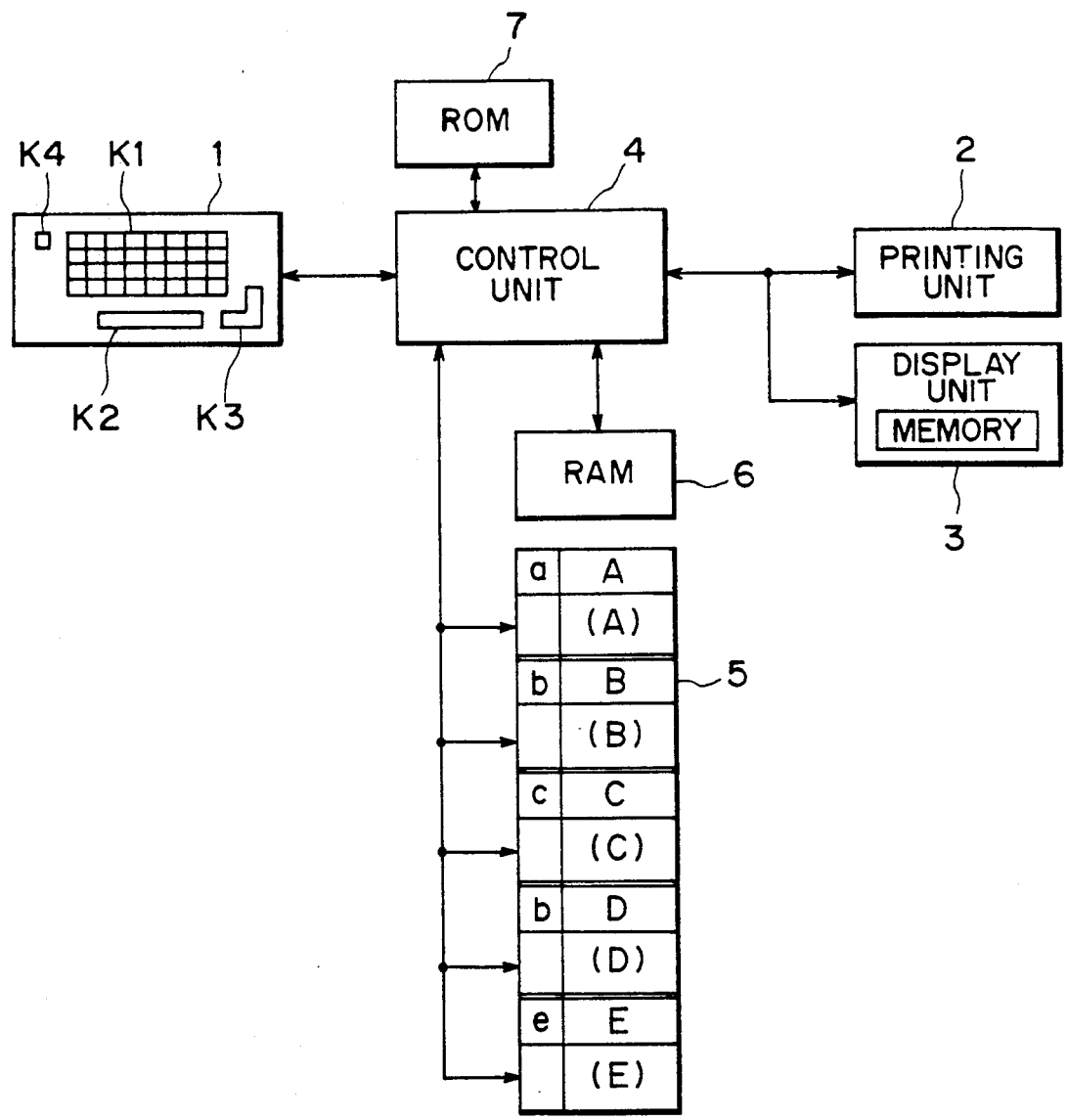
FIG. 1 shows a block diagram of one embodiment of the present invention.

FIG. 1 shows a first embodiment of the printer of the present invention. Numeral 1 denotes a keyboard input unit, numeral 2 denotes a print unit, numeral 3 denotes a display unit such as a ten-digit liquid crystal display having a ten-digit memory, numeral 4 denotes a control unit for controlling the above units, numeral 5 denotes a character generator memory (CG ROM) which stores therein five fonts A, B, C, D and E such as Courier, Elite and Pica, numeral 6 denotes a random access memory for storing therein one of addresses a-e of memory areas in which font names A-E are stored, in accordance with the selected font, and numeral 7 denotes a ROM which stores therein a control program as shown in the flow chart of FIG. 2.

The input unit 1 includes print keys such as character keys K1, a space key K2 and return key K3 as well as a key K4 for causing the display unit 3 to display the font name of the font currently being used. In this printer, characters are printed through the depression of the character keys K1 in accordance with necessary print information such as font name which is preset through the keyboard input unit 1.

Figure 2:
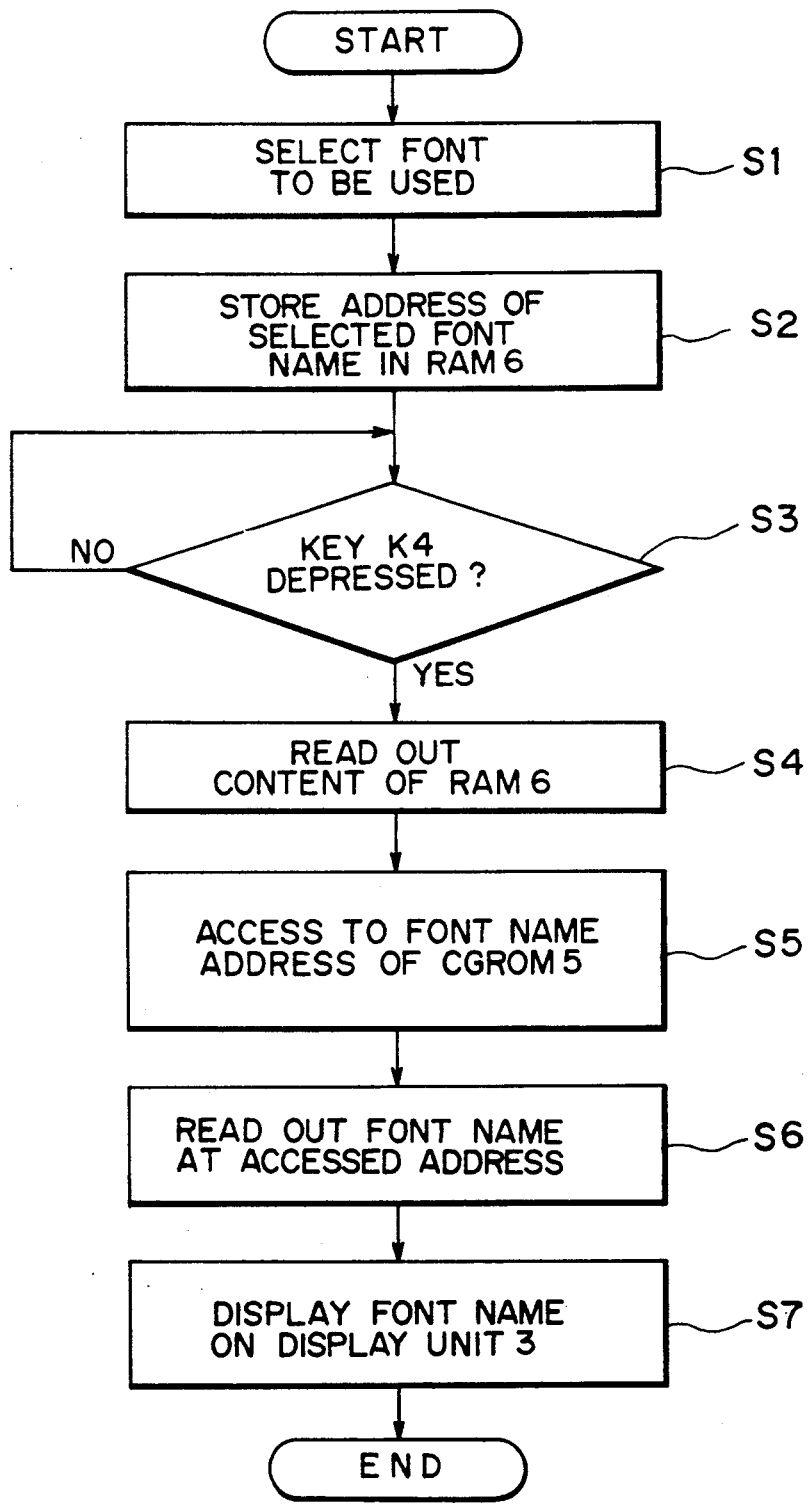
FIG. 2 is a flowchart showing a control procedure therefor.
Figure 8:
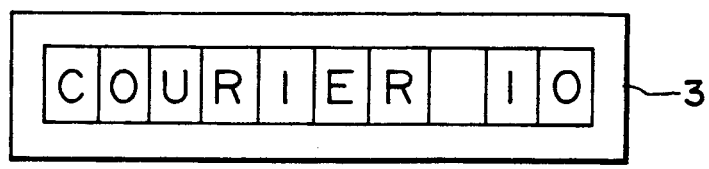
FIG. 8 shows an example of display on a display unit.

The control unit 4 controls the display of the font name in the procedure shown in FIG. 2. Prior to the operation of the printer, one of the fonts A-E to be used for printing is selected using the keyboard input unit 1. In a step S1, the address of the selected font name is obtained. In a step S2, the address is stored in the RAM 6. In a step S3, if the depression of the font name display key K4 is detected, the operation proceeds to a step S4 where the address in the RAM 6 is read out. In a step S5, that address of the CG ROM 5 is accessed, and in a step S6, the font name data stored at that address is read out. In a step S7, the font name read out, for example, Courier 10, is stored in the memory of the display unit 3 so that it is displayed on the display unit 3 as shown in FIG. 8.

In accordance with the present invention, the printer, which stores therein a number of fonts the font name currently being used can be displayed so that the operator can readily identify the font name being used.

Second Embodiment

Figure 3:
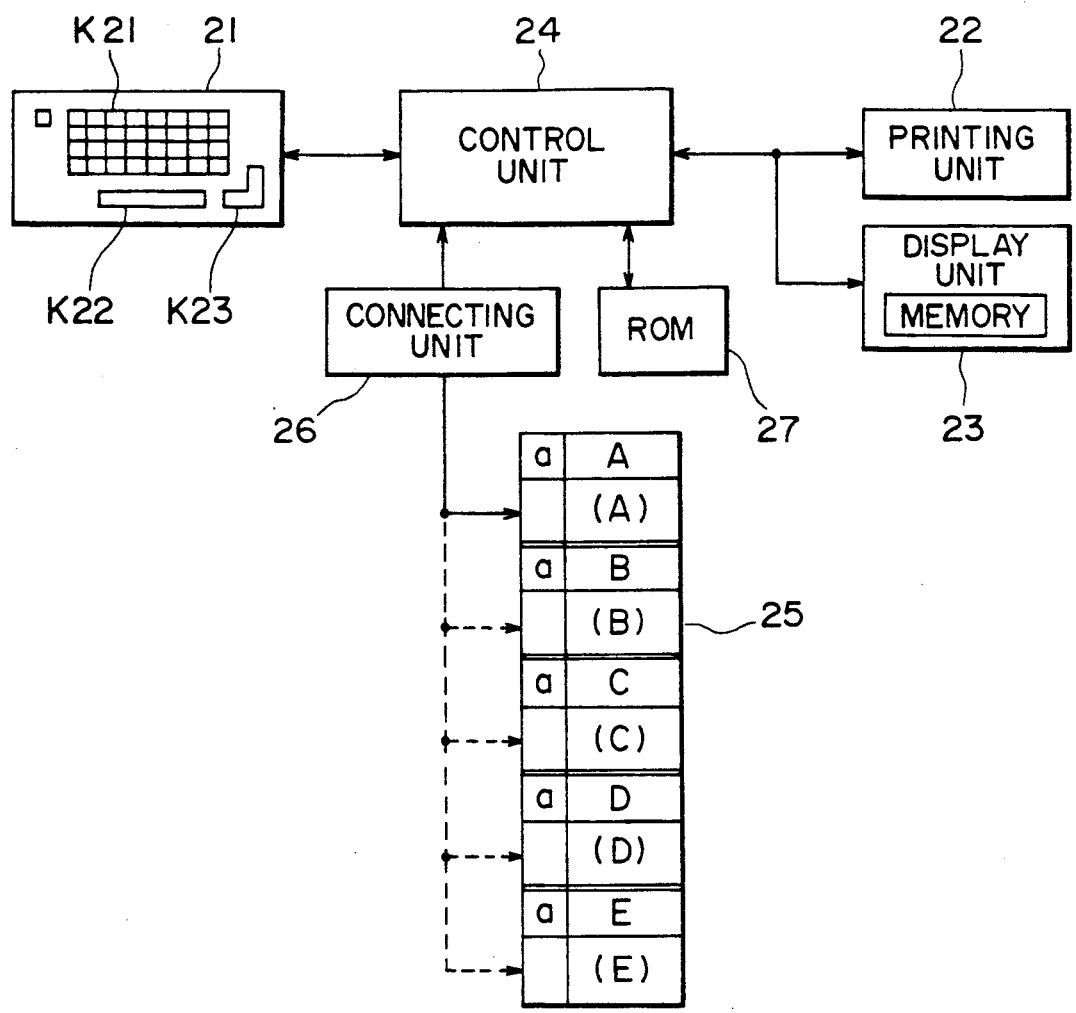
FIG. 3 is a block diagram of another embodiment of the present invention.

FIG. 3 shows a second embodiment of the printer of the present invention. Numeral 21 denotes a keyboard input unit which may include character keys K21, a space key K22 and a return key K23; Numeral 22 denotes a printer unit which may be a thermal transfer printer. Numeral 23 denotes a display unit which may includes a 10-digit alphanumeric liquid crystal display and a 10-digit alphanumeric memory; Numeral 24 denotes a control unit for controlling the above units of the printer and executes a control shown in FIG. 3, and numeral 25 denotes a character generator external memory (ROM) which stores therein character data on fonts A, B, C, D and E, for example, Courier, Elite and Pica.

Figure 4:
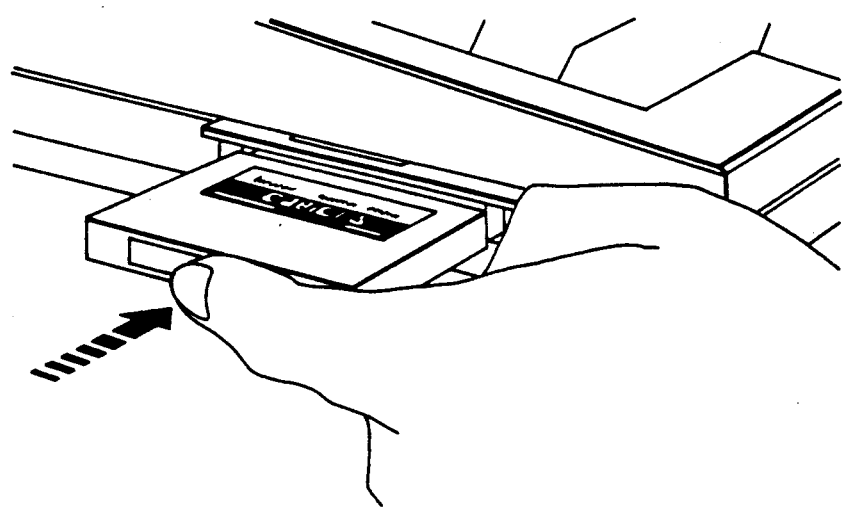
FIG. 4 is an external view of the other embodiment.

FIG. 4 shows an external view of the ROM 25. The font names A. B, C, D and E are stored at an address a of the character generator external memory 25. Numeral 26 denotes a connecting unit for connecting the character generator external memory 25 to the printer, which has the function informing the control unit 24 of the loading of the character generator external memory 25 to the printer, and numeral 27 denotes a ROM which stores therein a control program shown in a flowchart of FIG. 5.

Figure 5:
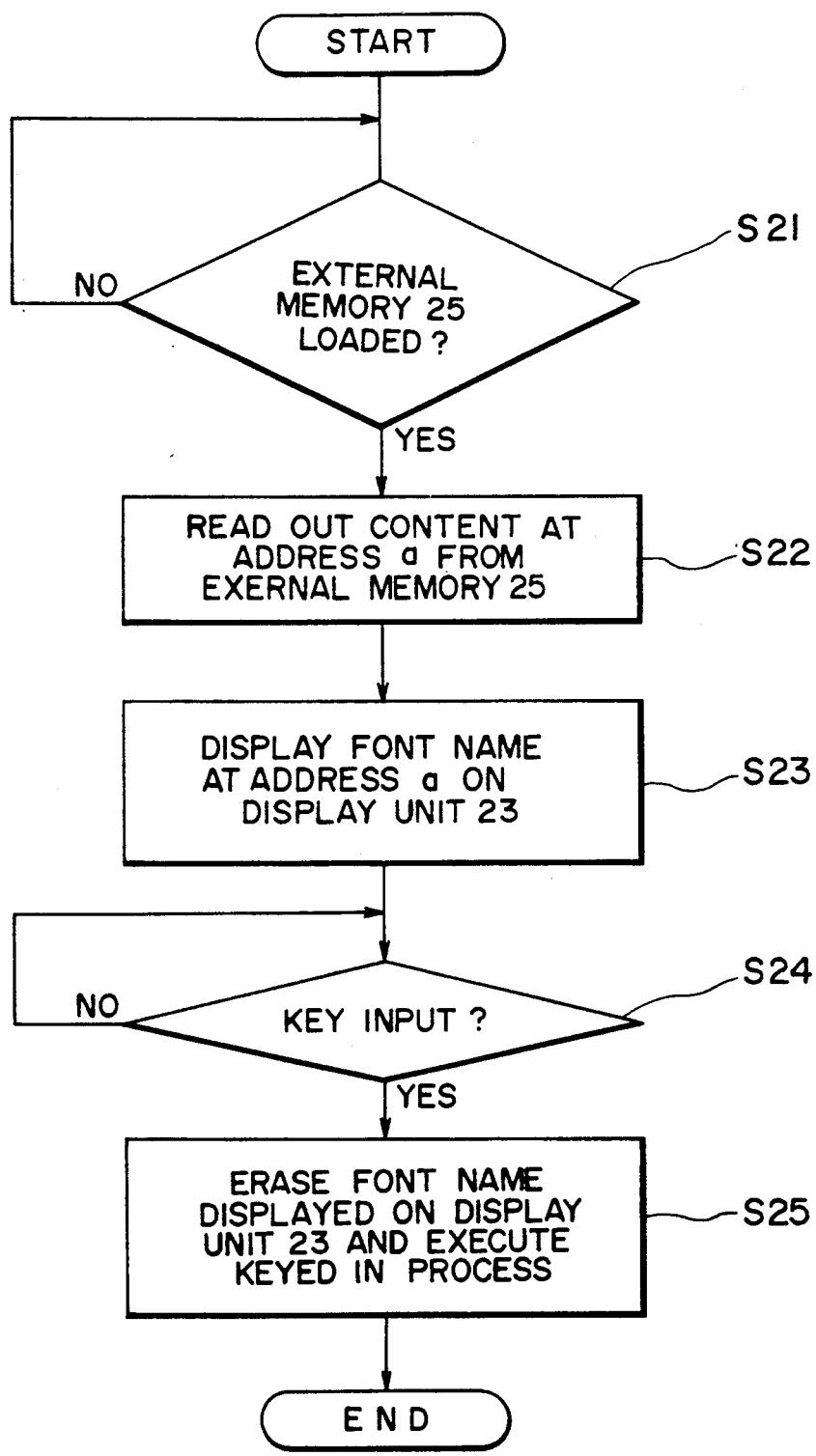
FIG. 5 is a flowchart showing a control procedure of the other embodiment.

FIG. 5 shows the flowchart of the control procedure to be executed by the control unit 24.

The operation of the present invention is now explained with reference to the flowchart of FIG. 5.

Prior to the operation of the printer, the character generator external memory 25 which stores therein the font to be used in printing is loaded to the printer as shown in FIG. 4.

In a step S21, the loading of the character generator external memory 25 to the printer is checked. If the loading of the external memory 25 is detected, the font name stored at address a of the external memory 25 is read out in a step S22. In a step S23, the font name is displayed on the display unit 23. For example, Courier 10 is displayed on the display unit 23 as shown in FIG. 8. In a step S24, if the depression of the character key K21, space key K22, return key K23 or other control key (not shown) is detected, the process proceeds to a step S25. In the step S25, the display of the font name on the display unit 23 is erased and the processing for the depressed key is performed. For example, if a character key is depressed, the corresponding character is printed and displayed, and if other control key is depressed, the corresponding control is executed.

In accordance with the present embodiment, since the font name selected from the plurality of fonts is indicated to the operator, the operability of the printer is enhanced.

Where the font information is stored in the external memory such as ROM, the font name is continuously displayed when the ROM is loaded to the printer until any key is depressed. Accordingly, no extra work is required to identify the print font.

Third Embodiment

Figure 6:
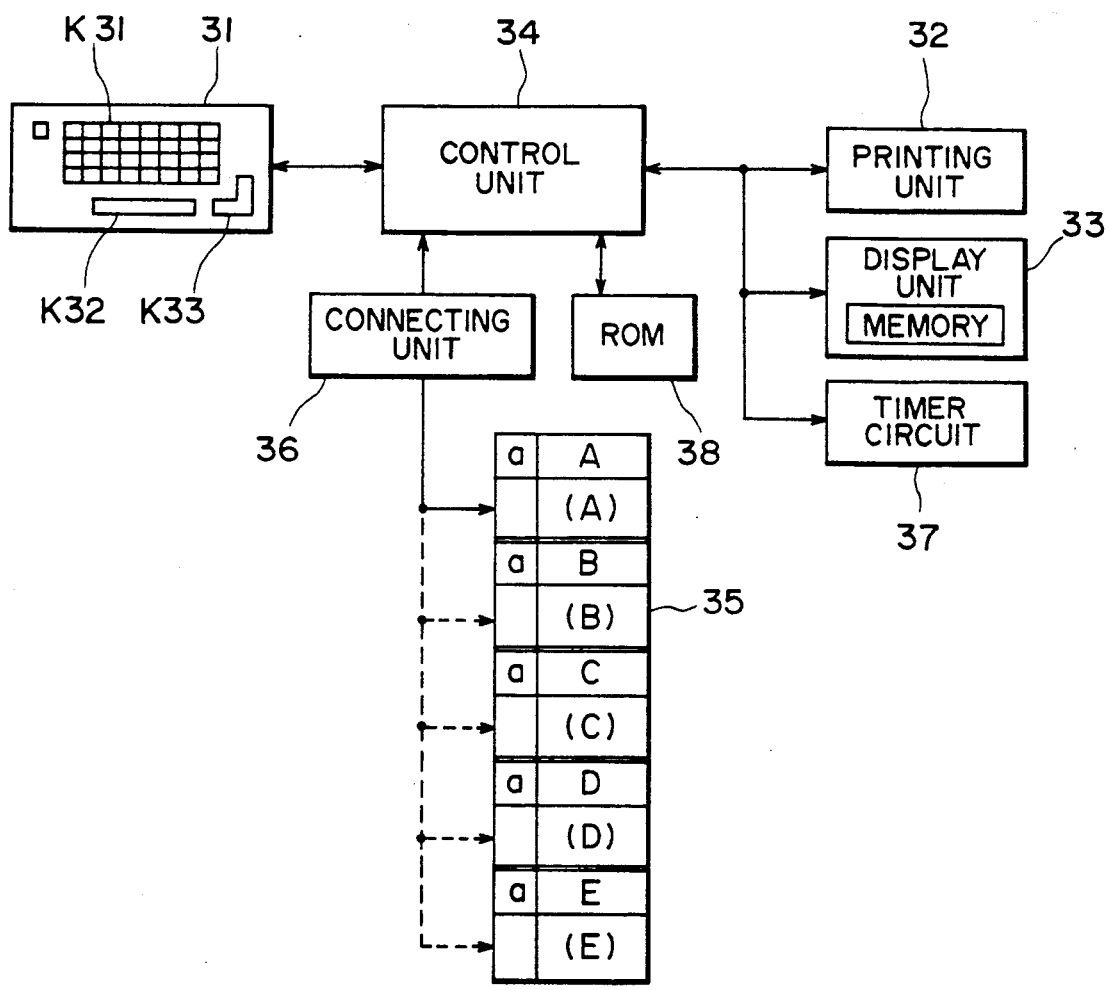
FIG. 6 is a block diagram of a further embodiment of the present invention.

FIG. 6 shows a third embodiment of the printer of the present invention. Numeral 31 denotes a keyboard input unit which may include character keys K31, a space key K32 and a return key K33, numeral 32 denotes a printer unit which may be a thermal transfer printer, numeral 33 denotes a display unit which may include a 10-digit alphanumeric liquid crystal display and an internal display memory, numeral 34 denotes a control unit which controls the above units of the printer and performs a control shown in FIG. 7, and numeral 35 denotes a character generator external memory (ROM) which stores therein character data on fonts A, B, C, D and E such as Courier, Elite and Pica. FIG. 4 shows an external view thereof. The font names A, B, C, D and E are stored at an address a of the character generator external memory 35. Numeral 36 denotes a connecting unit for connecting the character generator external memory 35 to the printer and has a function of informing the control unit 34 of the loading of the character generator external memory 35 to the printer, numeral 37 denotes a timer circuit which informs to the control unit 34 of the elapse of a predetermined time period under the control of the control unit 34, and numeral 38 denotes a ROM which stores therein a control program shown in a flowchart of FIG. 7.

Figure 7:
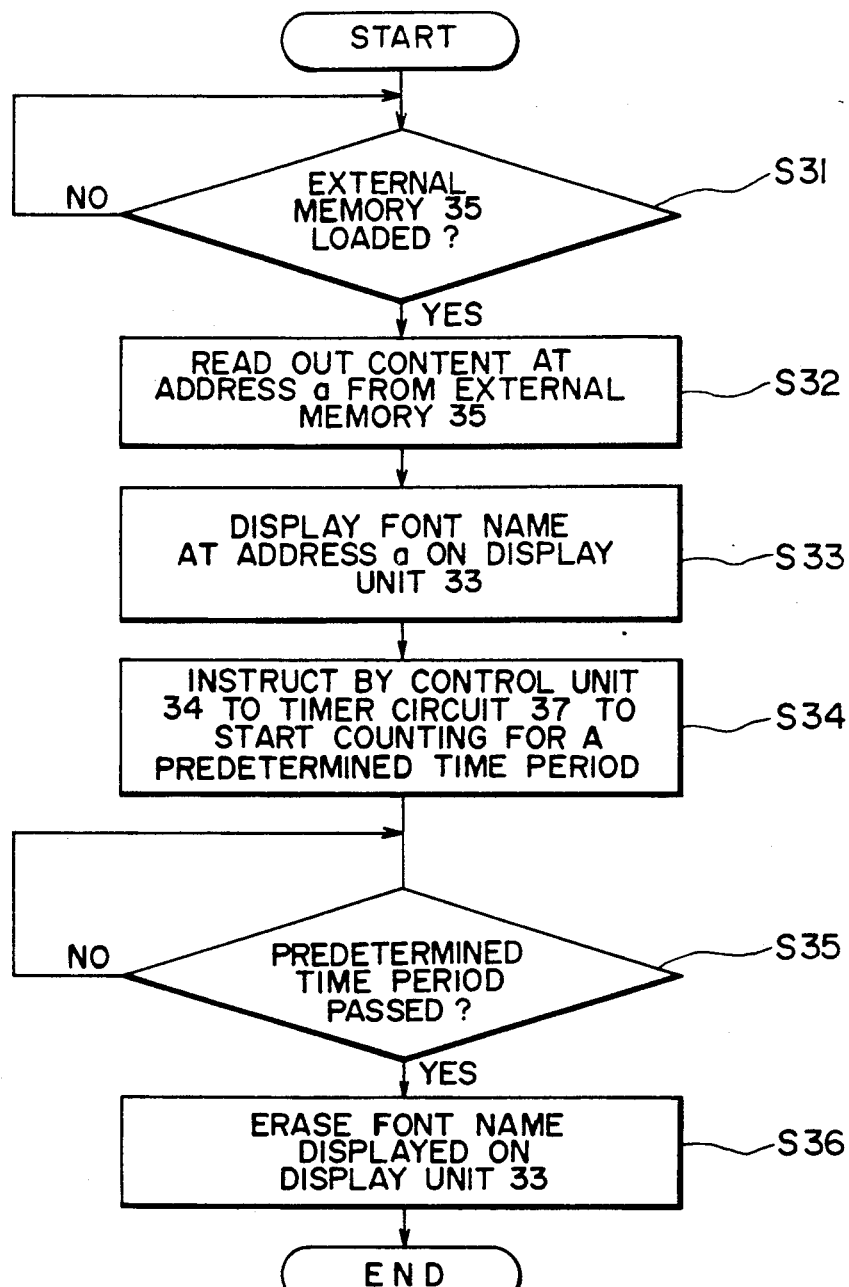
FIG. 7 is a flowchart showing a control procedure of the further embodiment.

FIG. 7 shows the flowchart of the control procedure to be executed by the control unit 34.

The operation of the present embodiment is now explained with reference to the flowchart of FIG. 7.

Prior to the operation of the printer, the character generator external memory 35 of the font to be used in printing is loaded to the printer as shown in FIG. 4.

In a step S31, the loading of the character generator external memory 35 to the printer is checked. If the loading of the external memory 35 is detected, the font name stored at the address a is read out in a step S32. In a step S33, the font name is displayed on the display unit 33. For example, Courier 10 is displayed on the display unit 33 as shown in FIG. 8. In a step S34, the control unit 34 causes the timer circuit 37 to start counting of a predetermined time period. If the elapse of the predetermined time period is detected in a step S35, the font name displayed on the display unit 33 is erased.

In accordance with the present embodiment, the font name selected from the plurality of font names is indicated to the operator. Thus, the operability of the printer is enhanced.

Where the font information is stored in the external memory such as ROM, the font name is displayed for the predetermined time period when the ROM is loaded to the printer. Accordingly, printing using a wrong font is prevented.

What I claim is:

1. Electronic equipment comprising:
  input means for inputting character data;
  external memory means pluggably attached to said electronic equipment for storing therein a character font and a font name corresponding to the character font;
  display means for displaying character data corresponding to the character data input by said input means or the font name of the character font;
  detecting means for detecting that said external memory means has been connected to said electronic equipment body;

read means for reading the font name stored in said external memory means when connection of said external memory means to said electronic equipment is detected by said detecting means; and display control means for controlling said display means to display the font name of the character font responsive to the reading by said reading means, to erase the display of the font name after a predetermined time period, and to display character data corresponding to the character data input by said input means.

2. Electronic equipment according to claim 1, wherein said external memory means is a ROM pack.

3. Electronic equipment according to claim 1, wherein said external memory means comprises a plurality of external memory means and font names corresponding to respective external memory means are stored at the same address of the external memory means.

4. Electronic equipment according to claim 1 further comprising a printer provided integrally with said electronic equipment for effecting printing in accordance with the font of the external memory means connected to said electronic equipment.

5. Electronic equipment comprising:

input means for inputting character data;

external memory means pluggably attached to said electronic equipment for storing therein a character font and a font name corresponding to the character font;

display means for displaying character data corresponding to the character data input by said input means or the font name of the character font;

detecting means for detecting that said external memory means has been connected to said electronic equipment body;

reading means for reading a font name stored in said external memory means when the connection of said external memory means to said electronic equipment is detected by said detecting means; and display control means for controlling said display means to display the font name of the character font responsive to the reading by said reading means, to erase the display of the font name on said display means when the character data is input by said input means, and to read the character data corresponding to the character data input by said input means from said external memory means and display the same on said display means.

6. Electronic equipment according to claim 5, wherein said external memory means is a ROM pack.

7. Electronic equipment according to claim 5, wherein said external memory means comprises a plurality of external memory means and the font names corresponding to respective external memory means are stored at the same address of the external memory means.

8. Electronic equipment according to claim 5 further comprising a printer provided integrally with said electronic equipment for effecting printing in accordance with the font of the external memory means connected to said electronic equipment.

* * * * *

UNITED STATES PATENT AND TRADEMARK OFFICE
CERTIFICATE OF CORRECTION

Page 1 of 2

PATENT NO. : 5,092,686
DATED : March 3, 1992
INVENTOR(S) : TAKAHIRO TSUKAMOTO

It is certified that error appears in the above-identified patent and that said Letters Patent is hereby corrected as shown below:

Title page, item
"[76] Inventor: Takahiro Tsukamoto, c/o Canon Kabushiki Kaisha, 30-2, 3-chome, Shimomaruko, Ohta-ku, Tokyo, Japan"
should read
item --[75] Inventor: Takahiro Tsukamoto, Tokyo, Japan item [73] Assignee: Canon Kabushiki Kaisha, Tokyo, Japan--.

item [56] REFERENCES CITED

Insert, --Attorney, Agent or Firm—Fitzpatrick, Cella, Harper & Scinto--

COLUMN 3

Line 5, "fonts the" should read --fonts, the--.
Line 16, "includes" should read --include--.
Line 30, "function" should read --function of --.

UNITED STATES PATENT AND TRADEMARK OFFICE
CERTIFICATE OF CORRECTION

PATENT NO. : 5,092,686
DATED : March 3, 1992
INVENTOR(S) : TAKAHIRO TSUKAMOTO

It is certified that error appears in the above-identified patent and that said Letters Patent is hereby corrected as shown below:

COLUMN 4

Line 22, "printer, numeral 37" should read
--printer. Numeral 37--.
Line 23, "to" should be deleted.

Signed and Sealed this

Eleventh Day of January, 1994

Attest:

BRUCE LEHMAN

Attesting Officer

Commissioner of Patents and Trademarks